United States Patent

[11] 3,604,544

| [72] | Inventors | Roy C. Ross<br>Springfield, Ill.;<br>Martin W. Coleman, Independence, Mo. |
|---|---|---|
| [21] | Appl. No. | 28,598 |
| [22] | Filed | Apr. 15, 1970 |
| [45] | Patented | Sept. 14, 1971 |
| [73] | Assignee | Allis-Chalmers Manufacturing Company<br>Milwaukee, Wis. |

[54] FORWARD-REVERSE TRANSMISSION AND BRAKE CONTROL FOR TRACTORS
5 Claims, 2 Drawing Figs.

[52] U.S. Cl. .................................................. 192/4 C,
 92/412, 192/3.57, 303/6
[51] Int. Cl. ........................................................ F16h 57/10
[50] Field of Search ............................................ 192/4, 4 A,
 4 C

[56] References Cited
UNITED STATES PATENTS

| 2,990,728 | 7/1961 | Grenier ......................... | 192/4 C |
| 3,106,273 | 10/1963 | Doerfer et al. ................. | 192/4 A |
| 3,437,184 | 4/1969 | Wilson ......................... | 192/4 C |

*Primary Examiner*—Benjamin W. Wyche
*Attorneys*—Charles L. Schwab, Kenneth C. McKivett and Robert B. Benson ABSTRACT: The vehicle brakes are automatically applied when the transmission is shifted to neutral in response to a decrease in pressure in the fluid supply for the fluid-operated forward and reverse clutches of the transmission.

PATENTED SEP 14 1971
3,604,544
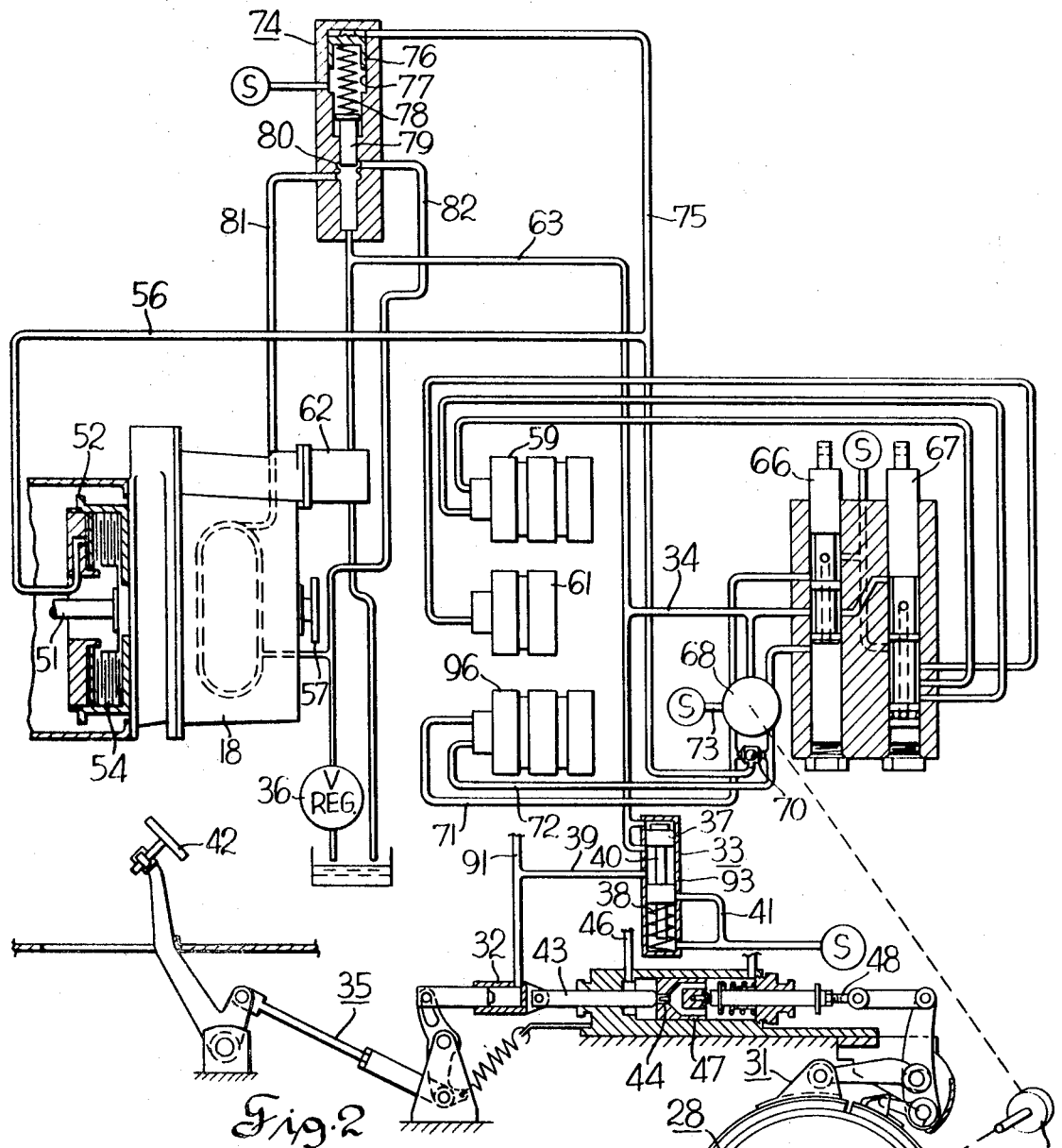
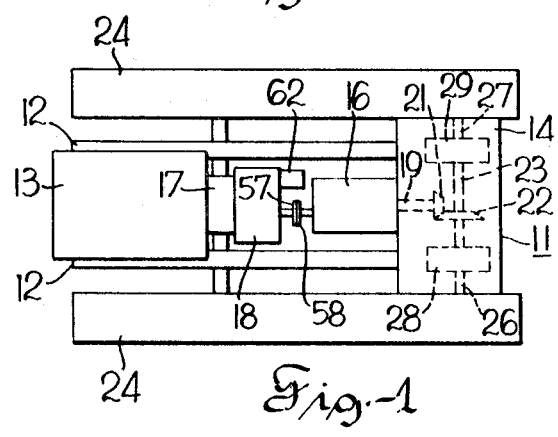
Fig. 2
Fig. 1
Inventors
Roy E. Ross
Marvin W. Coleman
By Charles L. Schwab
Attorney

FORWARD-REVERSE TRANSMISSION AND BRAKE CONTROL FOR TRACTORS

This invention relates to an automatic braking system, which is particularly useful in crawler tractors, wherein the tractor is braked in shifting from forward to reverse, or vice versa, to decelerate the tractor so that the load on the drive train components is reduced during the change in direction of travel. Heretofore, it has been a practice to provide a crawler tractor with a power train including power shift clutches in the change speed transmission to provide a plurality of forward speeds and a least one reverse speed. Also, a modulating clutch has been used between the engine and the transmission which is automatically disengaged when the operator reverses the direction of travel of the tractor. The modulating clutch serves to more gradually introduce the power from the engine to the transmission, thus preventing excessive load from being placed on the transmission clutches and power train. As crawler tractors have been designed to operate at higher speeds and have become larger, it has been an increasing problem to quickly change the direction of travel without subjecting the power train components to excessive loads. The present invention assists in changing vehicle direction quickly without subjecting the power train to excessive shock and torque loading.

It is the primary object of this invention to provide improved means to automatically brake a vehicle when it reverses direction of travel.

It is a further object of this invention to provide an improved automatic brake system for a vehicle wherein the brake is engaged when the transmission forward and reverse control is conditioned to a neutral position.

It is a further object of this invention to provide an automatic brake of the hereinbefore-outlined character wherein an actuator for the brake is actuated in response to reduced pressure in the transmission hydraulic control system when in neutral.

These and other advantages and objects of this invention will be apparent when the following description is read in conjunction with the drawings in which:

FIG. 1 shows a crawler tractor in which the present invention may be incorporated; and FIG. 2 is a schematic showing of the various components of a crawler tractor and including those of the present invention.

Referring to FIG. 1, a crawler tractor is illustrated in outline form wherein the main frame 11 of the crawler tractor includes a pair of forwardly extending beams 12 on which an internal combustion engine 13 is mounted. The rear end of the beams 12 are rigidly secured to a final drive housing 14 to which the change speed transmission 16 is secured. The engine 13 drives the change speed transmission 16 through a modulated clutch 17 and torque converter 18. The change speed transmission 16 has an output shaft 19 with a bevel drive pinion 21 engaging the bevel gear 22 on the central transverse shaft 23. Ground engaging traction means in the form of a pair of endless track belts 24 are driven by sprockets, not shown, connected to final drive shafts 26, 27 which are in turn connected to the central shaft 23 by a pair of combination clutch and brake mechanisms 28, 29 of which have brake drums secured for rotation with the shafts 26, 27 respectively.

Referring to FIG. 2, the means for automatically applying the brake 31 associated with the brake drum 30 of the clutch and brake mechanism 28 to prevent rotation of final drive shaft 26 includes a hydraulic actuator 32 in the brake linkage 35. The actuator 32 is supplied pressure fluid by a fluid pressure responsive brake valve 33 upon the pressure in the hydraulic supply conduit 63 for the transmission dropping to an intermediate pressure of approximately 60 p.s.i. When the pressure in supply conduit 63 is at a transmission clutch actuating pressure of approximately 200 p.s.i, the flow control element 37 of brake valve 33 will move under influence of the fluid pressure to compress spring 38 and move the value spool downwardly to close off supply conduit 63 from the brake actuator supply conduit 39 and connect the latter to sump through the return line 41. The brake 31 may be operated in a normal and overriding manner by the operator depressing pedal 42 to operate the valve member 43, thereby closing off port 44 and permitting pressure fluid supplied through line 46 to move piston 47 and rod 48 to the right to apply the brake 31.

In operation of the crawler tractor, the engine output shaft 51 is connected to the input member 52 of the torque converter 18 by a hydraulically actuated clutch 54 receiving the pressure fluid from a clutch supply conduit 56. The torque converter output element 57 is connected through a coupling 58, shown in FIG. 1, to the input shaft of the transmission 16 of which double-clutch assembly 59, single-clutch assembly 61 and forward and reverse clutch assembly 96 are parts. A hydraulic pump 62 is driven by the torque converter input member 52 supplying hydraulic pressure fluid to the main transmission clutch supply conduit 63 whenever the engine 13 is running. As illustrated in FIG. 2, forward and reverse control valve 66 is in the neutral position as is the speed control valve 67. In this condition, pressure fluid from conduit 63 and branch line 34 is blocked by the valves 66, 67 resulting in the inhibiter valve 68 blocking flow of fluid to the forward-reverse clutch assembly 96 and connecting the forward-reverse clutch conduits 71, 72 to sump by way of conduit 73. In this condition the conduit 75, which is connected to clutch operating conduits 71, 72 by a shuttle valve 70, is connected to sump through the inhibiter valve thereby permitting the spring-biased plunger 76 to assume the position at the upper end of bore 77 as shown in FIG. 2. With the regulating valve plunger 76 held in its low-pressure condition by spring 78, the plunger 79 will move upwardly to the position shown wherein pressure of the clutch supply conduit 63 will be connected not only to the torque converter by conduit 81 but also to a low pressure regulating valve 36 by way of conduit 82. This results in the pressure of the clutch supply conduit 63 being reduced to approximately 60 p.s.i. When the pressure in the transmission supply conduit 63 drops to this lower regulated value, the flow control element 37 of the brake control valve 33 moves upwardly to the position illustrated thereby connecting conduit 63 to conduit 39 by way of the reduced portion 40 of the valve element 37. Upon the actuator 32 being supplied with pressure fluid at 60 p.s.i., the actuator 32 will move the plunger 43 to the right, closing port 44 and causing the hydraulic pressure fluid supplied from a source, not shown, by way of conduit 46 to move the plunger 47 to the right, thereby applying the brake 31. It should be understood that a similar brake mechanism is provided for the clutch and brake assembly 29 and a branch conduit 91 connected to conduit 39 supplies an actuator in the braking mechanism for such other brake. It is to be understood that two independently operable foot pedals are provided for the two brakes associated with the two clutch and brake assemblies 28, 29.

When the forward-reverse control valve 66 is shifted upwardly, the forward clutch of the clutch pack assembly 96 will be engaged and the conduit 75 will be connected through shuttle valve 70 to the pressurized conduit 71 whereby the plunger 76 will be moved downwardly causing valve element 79 to close off the port 80 for conduit 82. As the regulating valve element closes off port 80 from the supply pressure, the pressure in supply conduit 63 will rise to approximately 200 p.s.i. When the pressure rises to this extent in conduit 63, the pressure at the upper end of the brake valve 33 will force valve element 37 downwardly to connect the supply conduit 39 with the reservoir conduit 41 thereby permitting disengagement of the brake 31. The brake 31 may be operated by the operator depressing pedal 42 regardless of operation of the actuator 32 by the brake valve 33.

When the tractor is moving in one direction and the operator moves the forward-reverse control valve 66 to select a change of direction, the inhibiter valve, which includes a control element sensitive to movement of the tractor through a travel-sensing mechanism 92, will delay pressure fluid supply to the clutch for effecting the new direction of travel until such time as the vehicle approaches a standstill. It is during this delay that the forward-reverse clutch conduits are at a reduced pressure, and thus, conduit 75 to the regulating valve is also at a reduced pressure, resulting in a system pressure drop to an intermediate level regulated by valve 36. At the reduced pressure level, the brake 31 will be automatically applied to assist in bringing the tractor to a halt, at which time the inhibiter valve pressurizes the appropriate forward or reverse clutch and the pressure increase in conduit 75 causes the pressure in supply conduit 63 to build up to the 200 p.s.i. level, thereby automatically disengaging the brake 31. This automatic application of the tractor brakes greatly increases the life of the power train components and reduces the time required to reverse the direction of tractor travel.

From the foregoing description it is apparent that when the control valve 66 for the forward and reverse clutches is moved to or through its neutral position, the pressure in the supply conduit 63 will be permitted by the regulating valve 74 to assume an intermediate pressure under the flow control of the minimum pressure regulating valve 36. When the supply conduit 63 is at the intermediate pressure, the force exerted against element 37 will be too small to overcome the force of spring 38, and the element 37 will assume the position illustrated. The housing 93 of valve 33 and the upper end of the element 37 constitute a hydraulic actuator which is in free flow fluid communication with supply conduit 63.

In the illustrated embodiment of this invention, the automatic brake control mechanism includes not only the element 37 and its hydraulic actuator built into the upper end of valve 33, but also the hydraulically operated device in the form of actuator 32 which forms part of the brake operating linkage. The foot pedal 42 may be employed to operate the brake 31 regardless of the operating condition of the pressure in the supply conduit 63. In other words, the foot pedal control affords a means to manually operate the brake in overriding relation to the automatic braking mechanism.

The embodiments of the invention in which an exclusive property or privilege is claimed are defined as follows:

1. In a vehicle having ground-engaging traction means selectively driven in forward or reverse directions through a transmission having hydraulically actuated forward and reverse clutches and a brake for the traction means, the combination comprising:
   hydraulic control means for said clutches including
      a source of hydraulic pressure fluid,
      a control valve having forward, reverse and neutral positions,
      a supply conduit connecting said source of pressure fluid with said control valve,
      a pressure-regulating valve means operative during vehicle operation to maintain the hydraulic pressure in said supply conduit at a relatively high pressure when said control valve is in one of its forward and reverse positions and operative to maintain said pressure fluid at an intermediate pressure below said high pressure when said control valve is moved to or through its neutral position, and
   an automatic brake control mechanism including
      an element operatively associated with said brake shiftable between brake engaged and brake release positions,
      a spring biasing said element toward its brake-engaging position,
      a hydraulic actuator operatively associated with said element, and
      fluid passage means connecting said hydraulic actuator to said supply conduit, said element being moved in opposition to said spring to said brake release position when said pressure in said supply conduit is at said high pressure, and said spring being operative to move said element to its brake apply position when said pressure in said supply conduit is at said intermediate pressure.

2. The invention of claim 1 wherein said brake control mechanism includes a brake control valve wherein said element is a flow control element and a hydraulically actuated device connected to said brake, said device being controlled by said brake control valve.

3. The invention of claim 2 and further comprising a manual control operatively associated with said brake and operable to cause engagement of the latter independently of the pressure in said supply conduit.

4. The invention of claim 3 wherein said manual control includes a foot pedal and a linkage intermediate said pedal and brake and wherein said device is part of said linkage.

5. The invention of claim 1 and further comprising a manual control operatively associated with said brake and operable to cause engagement of the latter independently of the pressure in said supply conduit.